No. 739,229. Patented September 15, 1903.

UNITED STATES PATENT OFFICE.

EDWARD SHAW, OF LONDON, ENGLAND.

PROCESS OF MAKING SWEETMEATS.

SPECIFICATION forming part of Letters Patent No. 739,229, dated September 15, 1903.

Application filed July 25, 1902. Serial No. 117,024. (No specimens.)

*To all whom it may concern:*

Be it known that I, EDWARD SHAW, a subject of the King of Great Britain and Ireland, residing at Broad street, in the city of London, England, have invented Improvements in the Manufacture of Sweetmeats and the Like, of which the following is a specification.

In the manufacture of sweetmeats, such as hard-boiled goods and the like, when sugar dissolved in water has been used without the addition of glucose it has been usual for comparatively small batches to be dealt with by skilled work-people who from experience are able to regulate the period of boiling, the amount of cream of tartar or other "killing" added thereto, and other conditions in such wise as to prevent subsequent recrystallization or deliquescence of the product. Skill and experience are necessary on account of the varying strengths of the sugar. What are known as "strong" sugars in the trade are those which require more killing to prevent subsequent recrystallization. The boiling of large quantities of sugar for the above purposes has been found difficult unless glucose is used in place of killing.

Now the object of this invention is to facilitate the manufacture of sweetmeats, jams, and the like in large quantities from "pure" sugars, for which purpose a proportion of the sugar used in the manufacture of the sweetmeats is first dissolved in water and the solution heated to boiling-point and then has added and rapidly mixed with it a solution of acid, such as tartaric acid, in water, the mixture being kept boiling for, say, one or two minutes. The solution is not used until the acid has nearly or quite caused the inversion of the sugar. In the preparation of the invert-sugar solution it is found advantageous to remove it immediately from the boiling-pan and evaporate it, preferably in what is known as a "Eureka" machine and which forms the subject of previous patents obtained by me, thereby concentrating and more rapidly inverting the sugar. The tartaric acid may conveniently be in the proportion of three and a half ounces to about one hundred and twelve pounds of sugar, the acid being dissolved in fifty ounces of water. The remainder of the sugar is dissolved in water and heated to boiling-point. The two solutions or syrups are amalgamated and the mixture then boiled to the required temperature. The mixture may consist of about four parts, by weight, of the plain-sugar solution to one of the sugar and tartaric-acid solution, the said solutions being of equal strength. Such a mixture is suitable for producing sweetmeats known as "hard-boiled" goods. In some cases the pure-sugar solution is treated with a quantity of alkali, such as dry carbonate of soda, (soda-ash.) For instance, there may be added to the plain-sugar solution an amount of dry carbonate of soda equal to seventy-five per cent. of the tartaric acid contained in the solution that is to be mixed therewith. The proportion of plain-sugar solution to tartaric-acid solution and the use of the dry carbonate of soda may be regulated according to the nature of the sweetmeat or the like to be produced, the object being to neutralize the free tartaric acid and prevent its causing further inversion of the sugar.

It is believed that the difficulty hitherto experienced in the manufacture of sweetmeats from pure sugar is due to the necessity of nicely proportioning the quantities of invert sugar and the uninverted or crystallizable sugar in the resulting product according to the characteristics it is sought to obtain. If there be an excessive proportion of invert sugar, which may be caused by allowing the sugar to be acted upon too long by water and heat or by the addition of too much killing—such as cream of tartar, tartaric or other acid—the product will deliquesce, while if the proportion of uninverted or crystallizable sugar be excessive the product will "grain." In the manufacture of sweetmeats generally the aim of the operator is to balance, as it were, the deliquescing and crystallizing properties of the product by regulating the proportion of invert sugar, (usually from twenty to thirty per cent. in hard-boiled goods.) Now in my improved process sugar is inverted by means of acid and added in suitable proportion to the crystallizable sugar, the mixture being then boiled, the required evaporation being effected before further material inversion of the crystallizable sugar is caused. Thus the proportion of invert sugar to crystallizable will be practically the same at the end as at the beginning of the boiling of the mixed solutions. This will be more nearly so when the alkali is used to neutralize the acid. Another advantage of the use of the neutralizing alkali is to free the finished goods of acid, which if the sugar were attacked by moisture would continue its inverting function, so that goods originally having a correct percentage of invert sugar if containing acid will become deliquescent.

In some cases some other acid than tartaric may be used and some other alkalies may be employed in place of dry carbonate of soda and the proportion used may be somewhat varied.

In conclusion I wish to point out that I have already tried the application of the alkali to "invert sugar" direct; but I find this objectionable, because the alkali has necessarily to be applied to the invert sugar under conditions where the acid is evenly distributed throughout the whole mass and the alkali is concentrated. Under such conditions the acid first encountered is neutralized; but for some reason, which I do not fully understand, the sugar becomes considerably discolored, probably owing to the splitting up of the levulose. Now in my process the invert sugar with the acid in is mixed with the sugar solution which has the alkali uniformly distributed throughout it. Hence as the mixture of invert sugar and cane-sugar takes place in no part of the mass is there an excess of alkali or an excess of acid; but gradual neutralization of the acid takes place throughout the whole mass, with the result that a very much better color is obtained than would otherwise be the case. I have found this from practical experience, and I have also found that the mixture of invert sugars and cane-sugars boil with much greater uniformity and finally produce goods of better color and which comply with all requirements as regards crystallization or deliquescence.

What I claim is—

1. The hereinbefore-described manufacture of sweetmeats, jam and the like with sugar wherein one part of the sugar is inverted by the addition of an acid, the other part treated by an alkali and added to the first-mentioned part in the required quantity, and the mixture of sugars subsequently further boiled to the desired degree, as set forth.

2. The hereinbefore-described manufacture of sweetmeats wherein one part of the sugar is inverted by the addition of tartaric acid in the proportion of about three and a half ounces of acid to one hundred and twelve pounds of sugar, the other part rendered alkaline and afterward added to the thus-inverted sugar in the required quantity, and the mixture of sugars subsequently further boiled to the desired degree, as set forth.

3. The hereinbefore-described manufacture of sweetmeats wherein one part of the sugar is inverted by the addition of tartaric acid in the proportion of about three and a half ounces of acid to one hundred and twelve pounds of sugar, the other part treated by an amount of alkali equal to seventy-five per cent. of the acid and afterward added to the thus-inverted sugar in the required quantity, and the mixture of sugars subsequently further boiled to the desired degree, as set forth.

4. The hereinbefore-described manufacture of sweetmeats wherein one part of the sugar is inverted by the addition of tartaric acid in the proportion of about three and a half ounces of acid to one hundred and twelve pounds of sugar, the other part treated by an amount of alkali equal to seventy-five per cent. of the acid and afterward added to the thus-inverted sugar in the required quantity, and the mixture of sugars subsequently further boiled to the desired degree, the said mixture consisting of about four parts by weight of the plain-sugar solution to one part by weight of the inverted sugar, as set forth.

Signed at 75-77 Cornhill, London, England, this 9th day of July, 1902.

EDWARD SHAW.

Witnesses:
PERCY E. MATTOCKS,
FRED. C. SMITH.